(12) United States Patent
Cottet

(10) Patent No.: US 11,427,309 B2
(45) Date of Patent: Aug. 30, 2022

(54) HINGED TRUCK ASSEMBLY FOR AIRCRAFT LANDING GEAR

(71) Applicant: The Boeing Company, Chicago, IL (US)

(72) Inventor: Justin D. Cottet, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/908,571

(22) Filed: Jun. 22, 2020

(65) Prior Publication Data
US 2021/0394890 A1 Dec. 23, 2021

(51) Int. Cl.
*B64C 25/12* (2006.01)
*B64C 25/34* (2006.01)

(52) U.S. Cl.
CPC .............. *B64C 25/12* (2013.01); *B64C 25/34* (2013.01); *B64C 2025/125* (2013.01)

(58) Field of Classification Search
CPC ......... B64C 25/10; B64C 25/12; B64C 25/34; B64C 25/36; B64C 2025/125; B64C 2025/345
See application file for complete search history.

(56) References Cited

U.S. PATENT DOCUMENTS 2,130,914 A * 9/1938 Warren ................... B64C 25/60
  244/104 R
2,332,844 A * 10/1943 De Muyser ............. B64C 25/12
  244/102 R
2,869,806 A * 1/1959 Beach ..................... B64C 25/16
  244/102 R

* cited by examiner

*Primary Examiner* — Richard G Davis

(57) ABSTRACT

A truck assembly for aircraft landing gear is provided. The truck assembly includes a hinge connecting a truck beam to a strut of the landing gear. The hinge is configured to allow the truck beam to rotate about the hinge relative to the strut transversely with respect to the length of the truck beam to thereby pivot the truck assembly relative to the strut between a landing position and a stowing position.

26 Claims, 11 Drawing Sheets

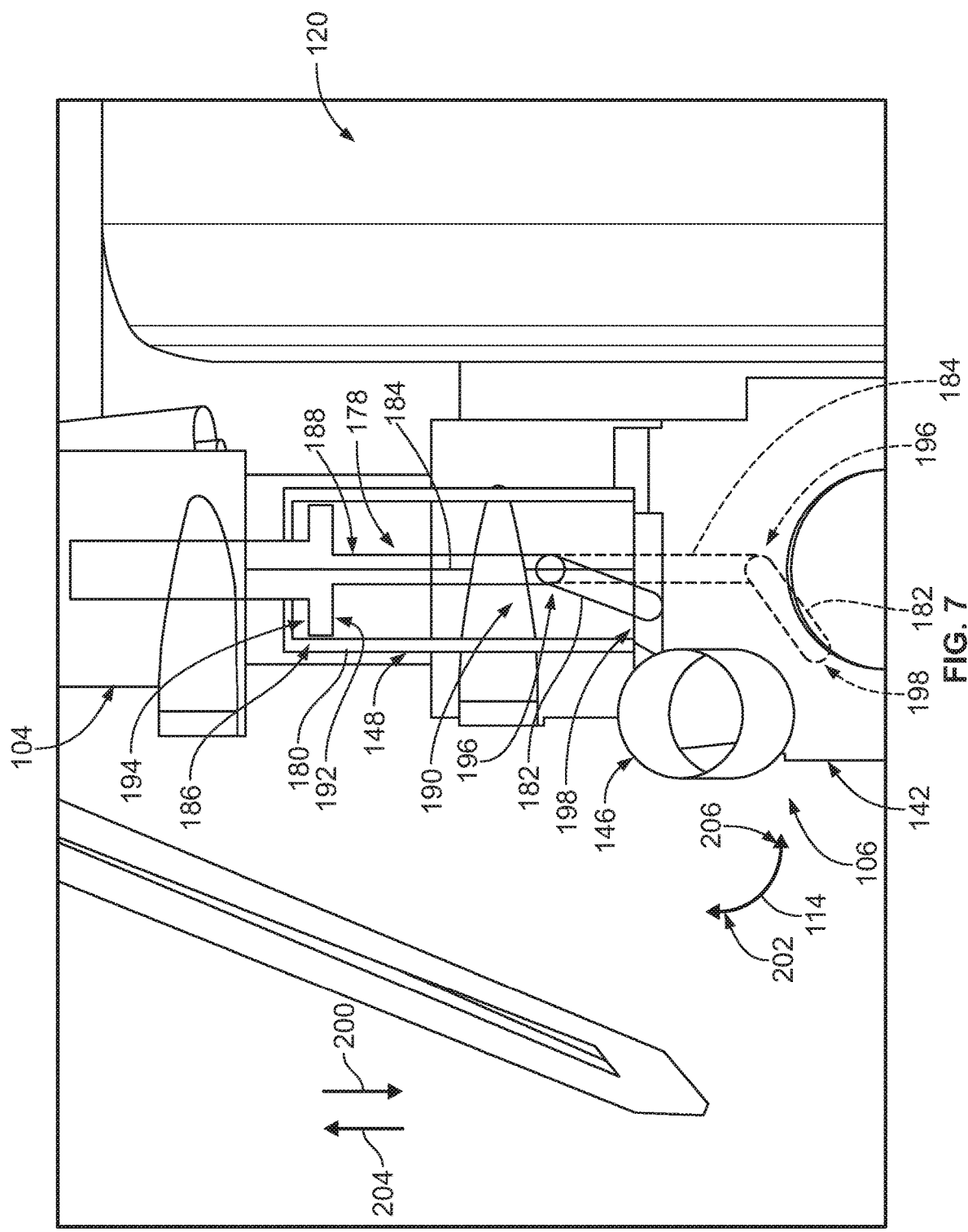

HINGED TRUCK ASSEMBLY FOR AIRCRAFT LANDING GEAR

BACKGROUND

At least some known landing gear arrangements of aircraft include fairings that cover the stowed landing gear during flight. However, such fairings increase the drag of the aircraft, which may limit the aircraft's range. For example, the fuselages of supersonic and hypersonic aircraft are often designed with a relatively narrow profile to provide the aircraft with a lower drag coefficient (e.g., the transonic area rule). Moreover, and for example, the width of some aircraft fuselages is relatively narrow at the location where the landing gear is stowed (e.g., a fuselage having an hour-glass shape, an aircraft having a wing-mounted engine, etc.). As the width of some aircraft fuselages is insufficient to fully contain the truck assembly of the landing gear within the fuselage, drag-increasing fairings may be required to fully enclose the stowed truck assembly during flight. Dual-tandem arrangements wherein the wheels of the landing gear are arranged in series (i.e., one in front of the other) are a known solution to reduce the frontal area of landing gear. However, a dual tandem arrangement may not enable the stowed truck assembly to be fully contained within a relatively narrow fuselage and therefore may still require drag-reducing fairings to fully enclose the stowed truck assembly.

SUMMARY

In one aspect, a truck assembly for aircraft landing gear is provided. The truck assembly includes a hinge connecting a truck beam to a strut of the landing gear. The hinge is configured to allow the truck beam to rotate about the hinge relative to the strut transversely with respect to the length of the truck beam to thereby pivot the truck assembly relative to the strut between a landing position and a stowing position.

In another aspect, an aircraft is provided. The aircraft includes landing gear that includes a strut and a truck assembly. The truck assembly includes a hinge connecting a truck beam to the strut. The hinge is configured to allow the truck beam to rotate about the hinge relative to the strut transversely with respect to the length of the truck beam to thereby pivot the truck assembly relative to the strut between a landing position and a stowing position.

In another aspect, a method of operating an aircraft is provided. The method includes pivoting a truck assembly of landing gear relative to a strut of the landing gear from a landing position to a stowing position; and pivoting the strut to move a wheel of the landing gear into a fuselage of the aircraft and thereby retract the landing gear.

BRIEF DESCRIPTION OF THE DRAWINGS

FIG. 7 is an enlarged elevational view of the truck assembly shown in FIGS. 2 and 3 illustrating the truck assembly in a landing position according to an implementation.

DETAILED DESCRIPTION

Figure 1:
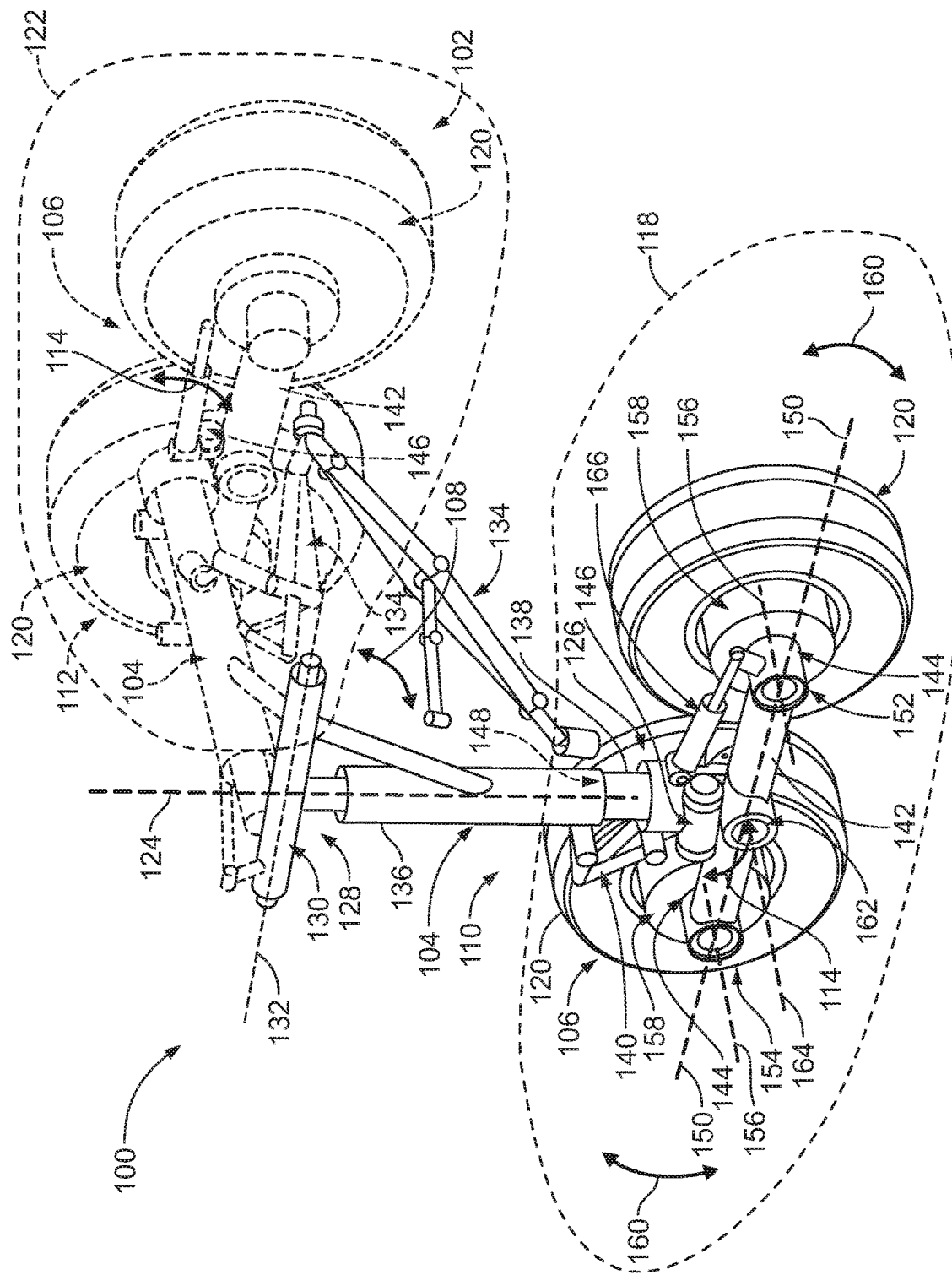
FIG. 1 is a perspective view illustrating landing gear for an aircraft according to an implementation.

The foregoing summary, as well as the following detailed description of certain embodiments and implementations will be better understood when read in conjunction with the appended drawings. As used herein, an element or step recited in the singular and preceded by the word "a" or "an" should be understood as not necessarily excluding the plural of the elements or steps. Further, references to "one embodiment" or "one implementation" are not intended to be interpreted as excluding the existence of additional embodiments or implementations that also incorporate the recited features. Moreover, unless explicitly stated to the contrary, embodiments "comprising" or "having" an element or a plurality of elements having a particular property can include additional elements not having that property.

While various spatial and directional terms, such as "top," "bottom," "upper," "lower," "vertical," and the like are used to describe embodiments and implementations of the present disclosure, it is understood that such terms are merely used with respect to the orientations shown in the drawings. The orientations can be inverted, rotated, or otherwise changed, such that a top side becomes a bottom side if the structure is flipped 180 degrees, becomes a left side or a right side if the structure is pivoted 90 degrees, and the like.

Certain implementations of the present disclosure provide a truck assembly for aircraft landing gear. The truck assembly includes a hinge connecting a truck beam to a strut of the landing gear. The hinge is configured to allow the truck beam to rotate about the hinge relative to the strut transversely with respect to the length of the truck beam to thereby pivot the truck assembly relative to the strut between a landing position and a stowing position.

Certain implementations of the present disclosure provide a method of operating an aircraft. The method includes pivoting a truck assembly of landing gear relative to a strut of the landing gear from a landing position to a stowing position; and pivoting the strut to move a wheel of the landing gear into a fuselage of the aircraft and thereby retract the landing gear.

Certain implementations of the present disclosure more efficiently stow the wheel(s) of landing gear within an aircraft fuselage, for example to reduce unused space in the fuselage and provide compact stowage of the landing gear system. For example, at least some existing landing gear systems have wheels that follow the orientation of the leg (i.e., the strut) of the landing gear as the leg pivots between deployed and retracted positions of the landing gear. Accordingly, when the existing landing gear is stowed in the retracted position of the landing gear, the wheels are oriented generally horizontally, which causes the landing gear to occupy more space in the wheel well and fuselage than desired.

Certain implementations of the present disclosure reduce the frontal area of an aircraft. For example, certain implementations eliminate, or reduce the size of, fairings used to enclose the wheel(s) of aircraft landing gear. Certain implementations of the present disclosure reduce the drag coefficient of an aircraft. Certain implementations of the present disclosure increase the operating range of an aircraft. Certain implementations of the present disclosure provide an increased design freedom of the size and location of the wheel well, which for example may increase fuel volume capacity, improve aero optimization, improve system integration (e.g., via routings of systems in and out of the wing, etc.) decrease weight (e.g., via mid-fuselage sizing, wing structural spar layout, structural efficiency, keel length sizing, etc.), and/or the like.

With references now to the figures, a perspective view of landing gear 100 for an aircraft 102 is provided in FIG. 1. The landing gear 100 includes a strut 104 (i.e., leg) and a truck assembly 106 (i.e., bogie assembly) mounted to the strut 104. The strut 104 is hingedly mounted to the aircraft 102 such that the strut 104 is configured to pivot (e.g., rotate, etc.) along an arc 108 between a deployed (i.e., extended) position 110 of the landing gear 100 and a retracted (i.e., stowed) position 112 of the landing gear 100. In FIG. 1, the deployed position 110 of the landing gear 100 is shown in solid lines, while the retracted position 112 is shown in phantom lines. As will be described in more detail below, the truck assembly 106 is hingedly mounted to the strut 104 such that the truck assembly 106 is configured to pivot (e.g., rotate, etc.) along an arc 114 relative to the strut 104 between a landing (i.e., deployed) position 118 of the truck assembly 106 (and thus of one or more wheels 120 of the truck assembly 106) and a stowing (i.e., retracted) position 122 of the truck assembly 106 (and thus the wheels 120).

The strut 104 extends a length along a longitudinal axis 124 from an end portion 126 to an opposite end portion 128. The truck assembly 106 is mounted to the end portion 126 of the strut 104. The opposite end portion 128 of the strut 104 is hingedly mounted to the aircraft 102 to enable the landing gear 100 to pivot between the deployed and retracted positions 110 and 112, respectively. For example, the end portion 128 of the strut 104 is mounted to the aircraft 102 at a hinge 130 having a hinge axis 132. The strut 104 is configured to rotate about the hinge axis 132 to thereby pivot between the respective deployed and retracted positions 110 and 112 of the landing gear 100. Pivoting of the strut 104 between the deployed position 110 and the retracted position 112 of the landing gear 100 is driven by any suitable actuator. In the exemplary implementation, the landing gear 100 includes a stabilization arm 134 that supports the strut 104 in the deployed position 110 and folds when the landing gear 100 is moved to the retracted position 112.

In the exemplary implementation, the strut 104 is a hydraulic damper defined by cylinders 136 and 138 that telescope relative to each other (sometimes referred to as a "shock strut"). The landing gear 100 optionally includes one or more torsion links 140 that facilitate preventing the cylinders 136 and 138 from rotating about the longitudinal axis 124 relative to each other (e.g., to prevent rotation of the truck assembly 106 about the longitudinal axis 124, etc.) In some other implementations, the strut 104 additionally or alternatively includes another type of damper. Moreover, the strut 104 does not provide any dampening functionality in some other implementations (e.g., the strut is a rigid beam, etc.). Optionally, the strut 104 includes a spring (e.g., a gas charge, a coil over spring, etc.). One non-limiting example of the strut 104 is an oleo strut.

Figure 2:
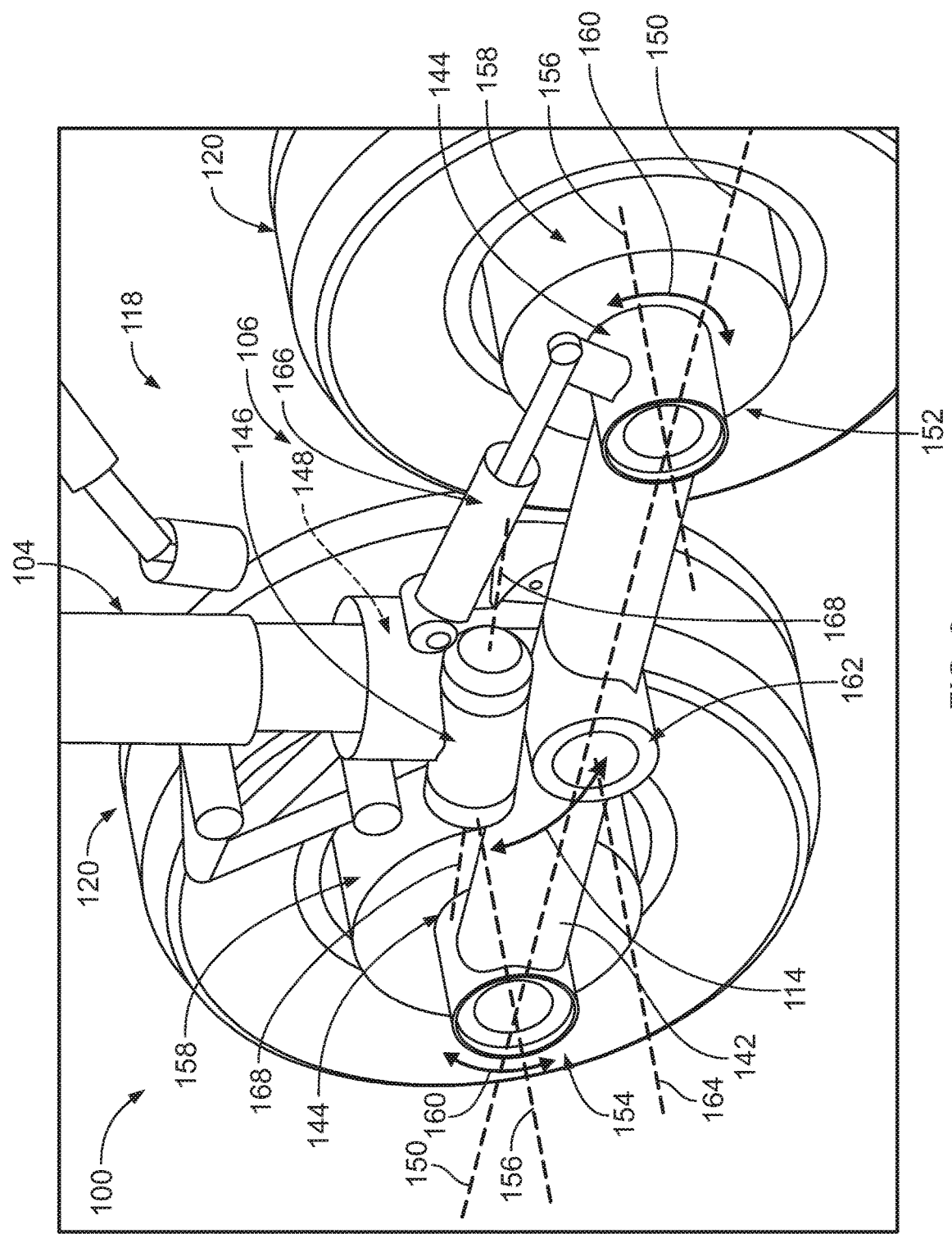
FIG. 2 is a perspective view illustrating a truck assembly of the landing gear shown in FIG. 1 according to an implementation.
Figure 3:
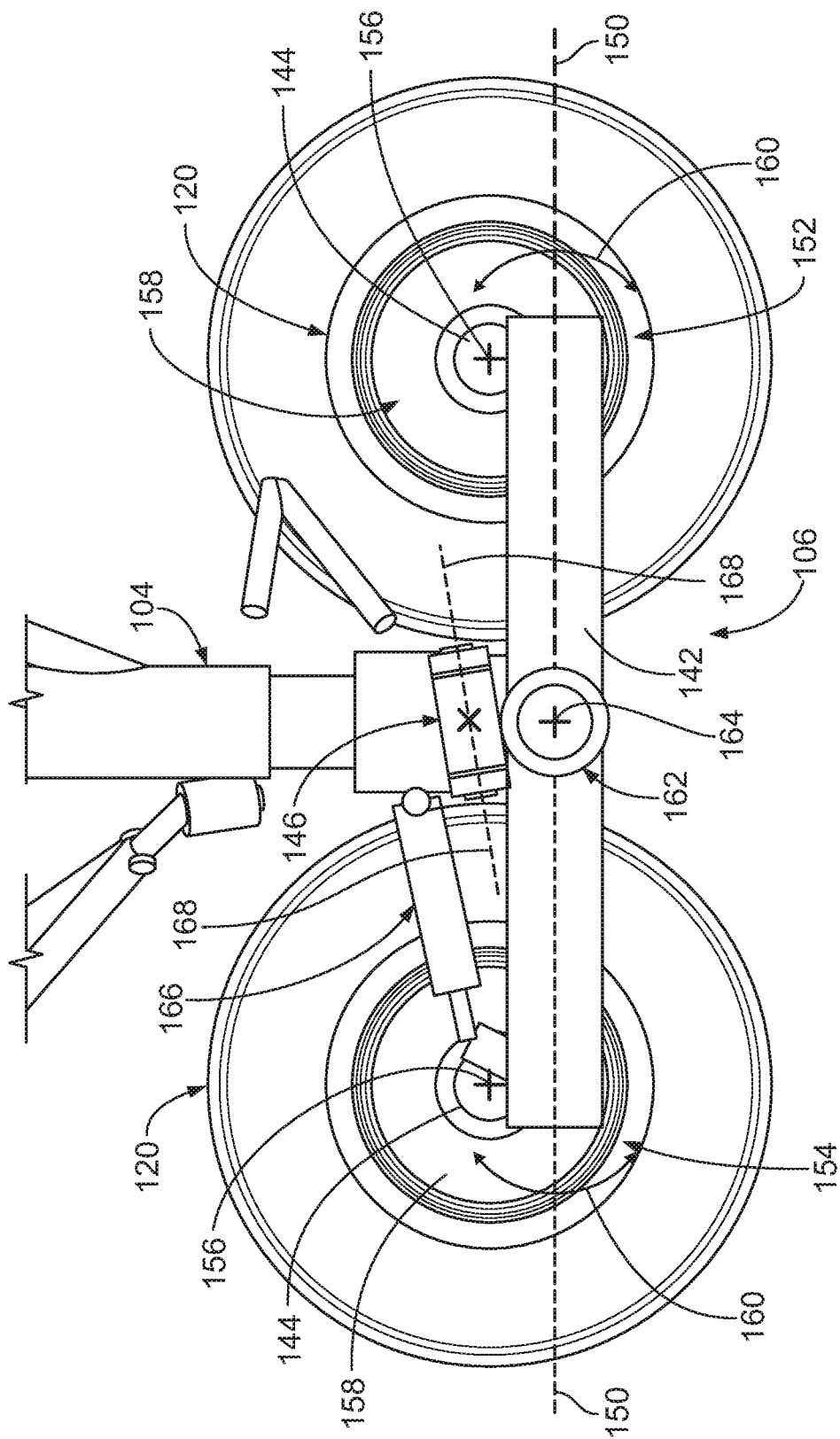
FIG. 3 is an elevational view illustrating the truck assembly shown in FIG. 2 according to an implementation.

Referring now to FIGS. 1-3, the truck assembly 106 includes a truck beam 142 (i.e., a bogie beam), one or more axles 144, the one or more wheels 120, a hinge 146, and an actuator 148 (not visible or labeled in FIG. 3). As will be described below, the actuator 148 is configured to rotate the truck beam 142 about the hinge 146 and thereby pivot the wheels 120 between the landing position 118 (best shown in FIG. 1) and the stowing position 122 (best shown in FIG. 1). The truck beam 142 extends a length along a central longitudinal axis 150 from an end portion 152 to an opposite end portion 154. The axles 144 are mounted to the truck beam 142 and include corresponding axes of rotation 156. Each wheel 120 is mounted to a corresponding axle 144 such that the wheel 120 rotates about the axis of rotation 156 of the corresponding axle 144. One or more of the wheels 120 optionally includes a brake assembly 158. Although the axles 144 are shown as being mounted to the truck beam 142 at the end portions 152 and 154, in other implementations one or more of the axles 144 is mounted to the truck beam 142 at any other location along the length of the truck beam 142. The hinge 146 may be referred to herein as a "first hinge".

Although shown as including two wheels 120, the truck assembly 106 may include any other number of wheels 120 (e.g., a single wheel 120, three wheels 120, four or more wheels 120, etc.). In the exemplary implementation, the wheels 120 have a dual-tandem arrangement wherein the wheels 120 are arranged one in front of the other along the length of the truck beam 142. In other words, the wheels 120 are arranged in series along the central longitudinal axis 150 of the truck beam 142. In other implementations, two or more wheels 120 are arranged side-by-side (i.e., in parallel) along the length of the truck beam 142. Moreover, in some implementations the truck assembly 106 includes two or more groups of wheels 120 that are arranged in series along the length of the truck beam 142, with the wheels 120 within each group being arranged side-by-side relative to each other.

In the exemplary implementation, the truck beam 142 is configured to pivot relative to the strut 104 longitudinally with respect to the length of the truck beam 142. In other words, the truck beam 142 is configured to pivot along an arc 160 relative to the strut 104. As can be seen in FIGS. 1-3, the arc 160 is oriented relative to the central longitudinal axis 150 of the truck beam 142 such that the longitude (i.e., the length) of the truck beam 142 pivots relative to the strut 104. Specifically, the truck beam 142 includes a hinge 162 having a hinge axis 164. The truck beam 142 is configured to rotate about the hinge axis 164 of the hinge 162 such that the truck beam 142 pivots along the arc 160 relative to the strut 104. In other words, the truck assembly 142 is pivotally attached to the strut 104 to enable free movement of the truck assembly 142 about the hinge axis 164. Pivoting of the truck beam 142 along the arc 160 enables the pitch of the truck beam 142 to be adjusted (whether actively and/or passively), for example to orient the rear wheels 120 below the front wheels 120 such that the rear wheels 120 contact the runway before the front wheels 120 during landing, to evenly distribute ground loads and thereby enable the wheels 120 to follow the contours of the pavement, etc. The arc 160 may be referred to herein as a "first arc". The hinge 162 may be referred to herein as a "second hinge", and the hinge axis 164 may be referred to herein as a "second hinge axis".

Optionally, the truck assembly 106 includes an actuator 166 operatively connected between the truck beam 142 and the strut 104 for actuating the pivoting motion of the truck beam 142 along the arc 160. The actuator 166 enables active control of the pitch of the truck beam 142, for example to orient the rear wheels 120 below the front wheels 120 before touchdown, to evenly distribute ground loads and thereby enable the wheels 120 to follow the contours of the pavement, etc. In the exemplary implementation, the actuator 166 also acts as a passive damper, for example to dampen pivoting motion of the truck beam 142 along the arc 160 as the front wheels 120 move into contact with the runway after the rear wheels 120. In other implementations, a discrete passive damper is provided in addition or alternative to the actuator 166. In the exemplary implementation, the actuator 166 includes a hydraulic linear actuator, but the actuator 166 additionally or alternatively includes any other type of actuator, such as, but not limited to, another type of linear actuator, a rotary actuator, and/or the like. Optionally, a spring (e.g., a gas charge, a coil over spring, etc.) is provided in addition or alternative to the actuator 166 and/or the discrete passive damper.

Figure 4:
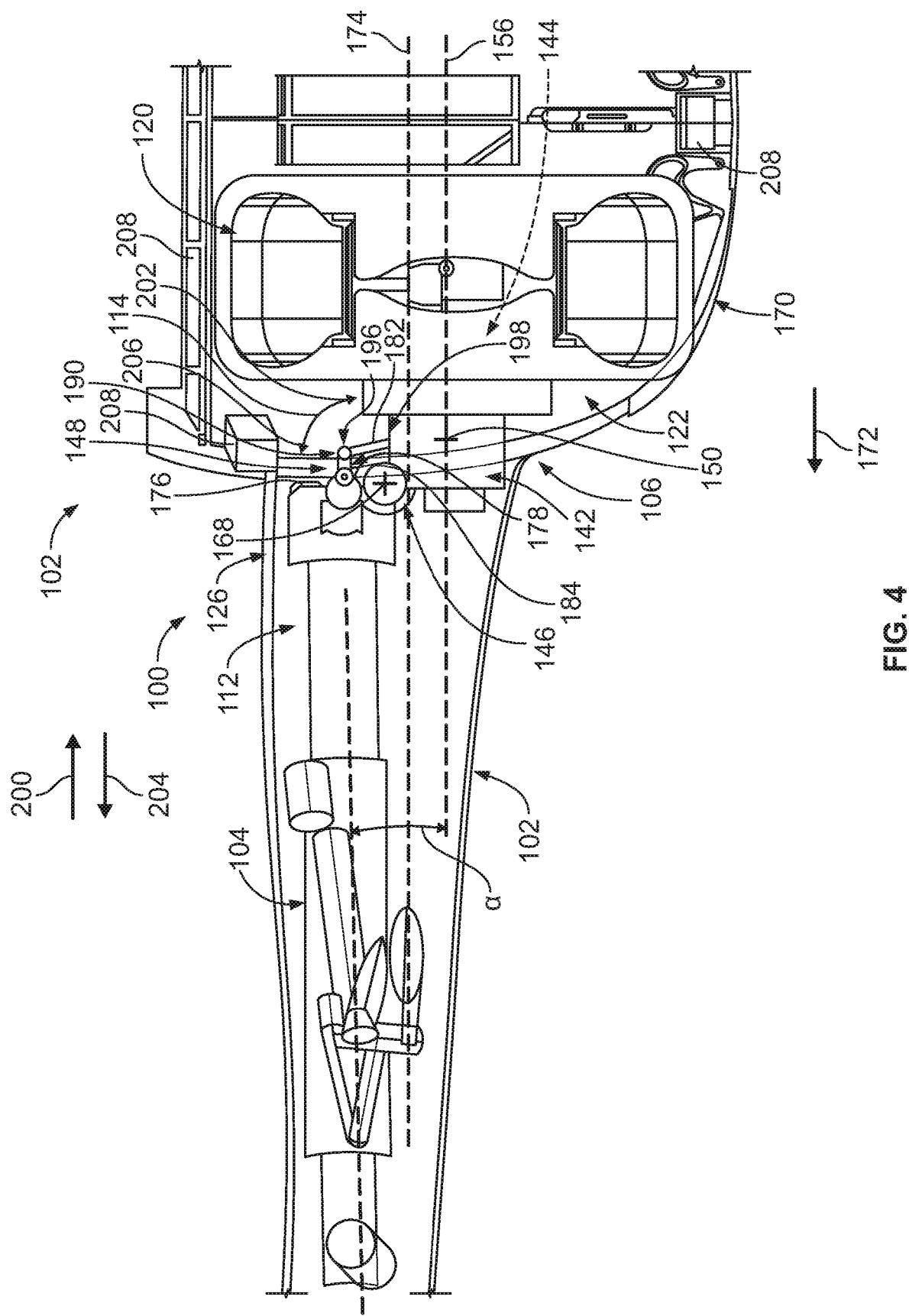
FIG. 4 is an elevational view of the landing gear shown in FIG. 1 illustrating the truck assembly shown in FIGS. 2 and 3 in a stowing position according to an implementation.
Figure 5:
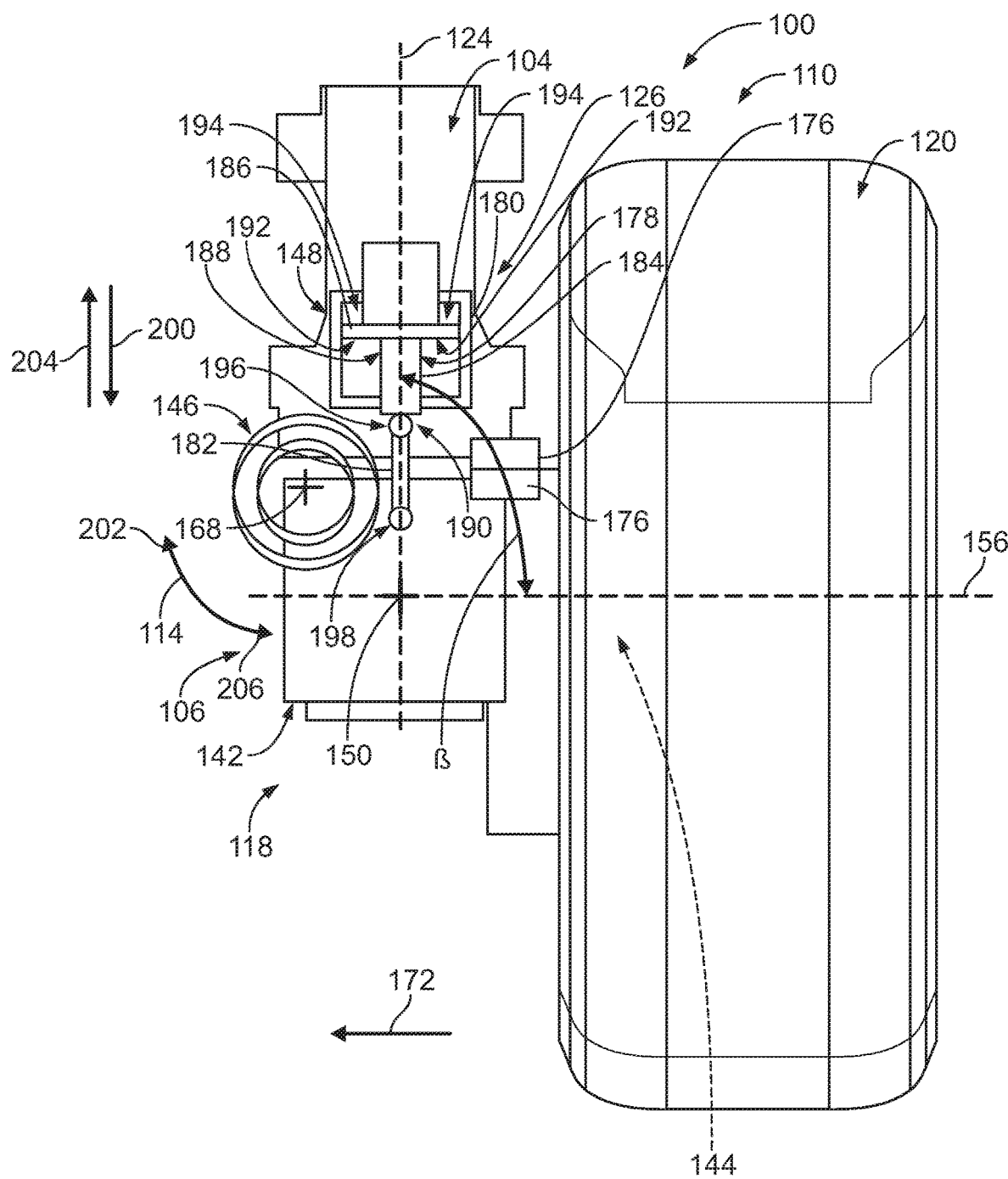
FIG. 5 is an elevational view of the truck assembly shown in FIGS. 2 and 3 illustrating the truck assembly in a landing position according to an implementation.

Referring now to FIGS. 4 and 5, as briefly described above, the truck assembly 106 is hingedly mounted to the strut 104 such that the truck assembly 106 is configured to pivot (e.g., rotate, etc.) along the arc 114 relative to the strut 104 between the landing position 118 and the stowing position 122. FIG. 4 illustrates the truck assembly 106 in the stowing position 122 with the landing gear 100 in the retracted position 112, while FIG. 5 illustrates the truck assembly 106 in the landing position 118 with the landing gear 100 in the deployed position 110.

The truck assembly 106 is mounted to the strut 104 at the hinge 146. Specifically, the hinge 146 connects the truck beam 142 to the strut 104, as is shown in FIGS. 4 and 5. The hinge 146 includes a hinge axis 168. The truck beam 142 rotates about the hinge 146 (along the arc 114) relative to the strut 104. Specifically, the truck beam 142 is configured to rotate about the hinge axis 168 along the arc 114 relative to the strut 104. As shown in FIGS. 4 and 5, the hinge 146 is configured to allow (i.e., enable) the truck beam 142 to rotate about the hinge 146 relative to the strut 104 transversely with respect to the length of the truck beam 142. In other words, the arc 114 along which the truck beam 142 rotates about the hinge 146 extends in a transverse direction relative to the central longitudinal axis 150 of the truck beam 142. As best seen in FIGS. 2 and 3, the hinge axis 168 of the hinge 146 extends non-parallel (e.g., transversely, etc.) relative to the hinge axis 164 of the hinge 162. As best seen in FIGS. 1 and 2, the arc 114 extends non-parallel (e.g., approximately perpendicular, etc.) relative to the arc 160. The hinge axis 168 may be referred to herein as a "first hinge axis". The arc 114 may be referred to herein as a "second arc". In other examples, other configurations are contemplated such as where the arc 114 extends parallel relative to arc 160.

Referring again to FIGS. 4 and 5, rotation of the truck beam 142 about the hinge axis 168 relative to the strut 104 pivots (e.g., rotates, etc.) the truck assembly 106 along the arc 114 relative to the strut 104. The truck assembly 106 is configured to pivot along the arc 114 relative to the strut 104 between the stowing position 122 shown in FIG. 4 and the landing position 118 shown in FIG. 5. As can be seen in FIG. 4, when the landing gear 100 is in the retracted position 112, the wheels 120 of the truck assembly 106 are stowed within a fuselage 170 of the aircraft 102 in the stowing position 122. When the landing gear 100 is in the deployed position 112 (best seen in FIG. 1), the wheels 120 of the truck assembly 106 are in the landing position 118 shown in FIG. 5, wherein the wheels 120 are oriented (e.g., approximately vertically, etc.) for landing (e.g., contacting and rolling along the runway, etc.).

As shown in FIGS. 4 and 5, the hinge axis 168 of the hinge 146 is offset from the central longitudinal axis 150 of the truck beam 142 in the direction of the arrow 172. The offset between the axes 168 and 150 enables the truck beam 142 to rotate along the arc 114 away from the end portion 126 of the strut 104 toward the stowing position 122 of the wheels 120.

As can be seen from a comparison of FIGS. 4 and 5, the angle of the axes of rotation 156 of the axles 144 relative to the length of the strut 104 changes as the truck assembly 106 pivots between the landing and stowing positions 118 and 122, respectively. For example, FIG. 4 illustrates that the axes of rotation 156 of the axles 144 extend at an angle α relative to the longitudinal axis 124 of the strut 104 in the stowing position 122 of the wheels 120, while FIG. 5 illustrates that the axes of rotation 156 of the axles 144 extend at an angle β relative to the longitudinal axis 124 of the strut 104 in the landing position 118 of the wheels 120. As evident from a comparison on FIGS. 4 and 5, the angles α and β have different values. For example, in the exemplary implementation of the stowing position 122, the angle α of the axes of rotation 156 extends at approximately 10° relative to the longitudinal axis 124 of the strut 104, while the angle β of the axes of rotation 156 extends approximately perpendicular (i.e., approximately 90°) to the longitudinal axis 124 of the strut 104 in the exemplary implementation of the landing position 118.

Figure 6:
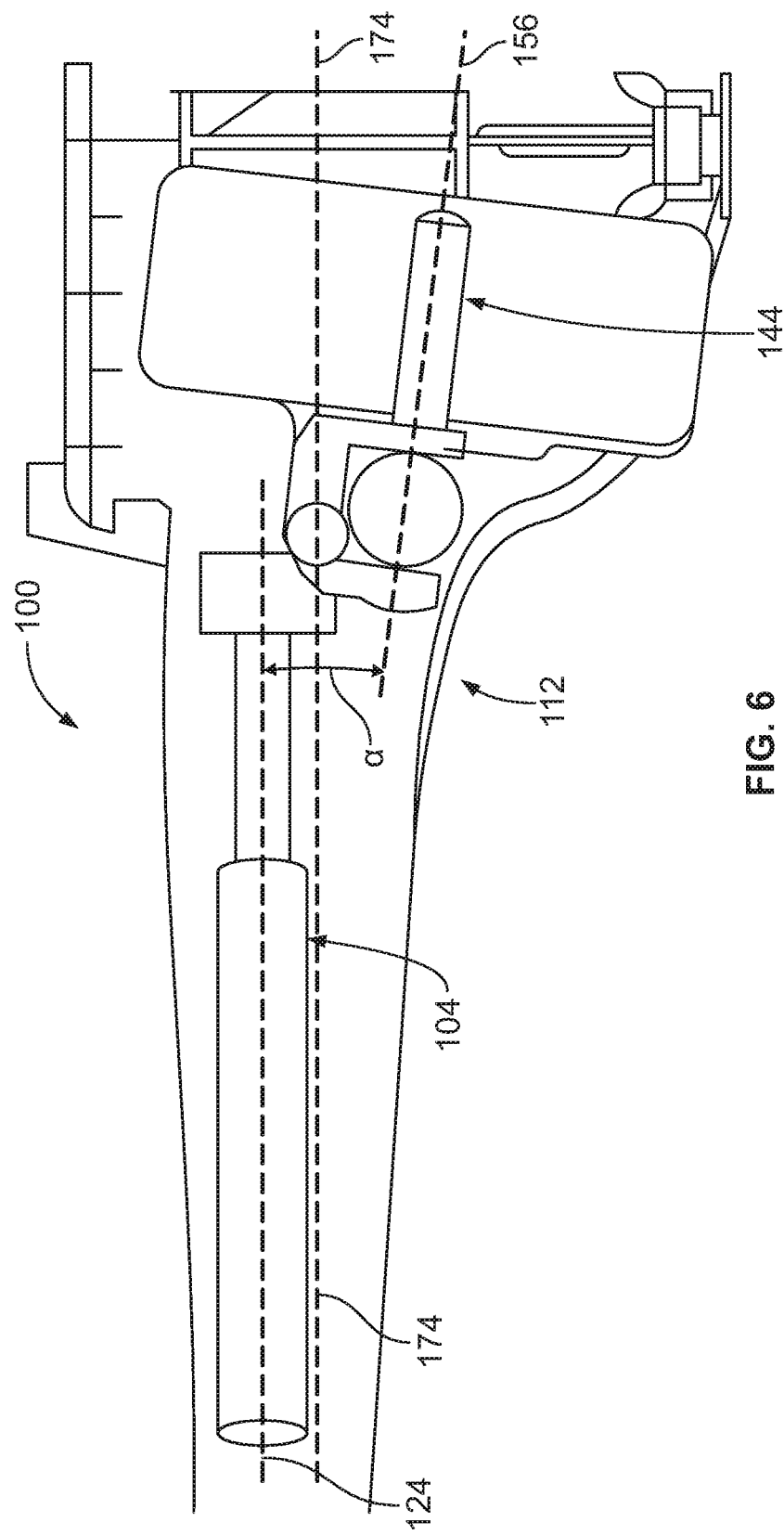
FIG. 6 is an elevational view of the landing gear shown in FIG. 1 illustrating the truck assembly shown in FIGS. 2 and 3 in another implementation of a stowing position.

In other implementations, the angles α and/or angle β have other values, for example: the angle β has value of less than approximately 90°; the angle β has value of greater than approximately 90°; the angle α has value of greater than approximately 10° (e.g., approximately 15° as shown in the implementation of FIG. 6, etc.); the angle α has value of approximately 170°; the angle α has value of less than approximately 170°; the angle α has value of approximately 0° (i.e., the axes of rotation 156 are approximately parallel with the longitudinal axis 124 in the stowing position 122); etc. Although shown as having a range of motion of approximately 100° between the landing position 118 and the stowing position 122, the truck assembly 106 may have any other value of range of motion between the positions 118 and 122 that enables the landing gear 100 to function as described and/or illustrated herein (e.g., approximately 90°, approximately 80°, approximately 75°, approximately 95°, greater than approximately 100°, less than approximately 75°, etc.). Moreover, although the longitudinal axis 124 of the strut 104 is shown in FIG. 4 as extending at an oblique angle of approximately 10° relative to a pitch axis 174 of the aircraft 102 when the landing gear 100 is in the retracted position 112, the longitudinal axis 124 may extend at any angle relative to the pitch axis 174 in the retracted position 112 of the landing gear 100. For example, FIG. 6 illustrates another exemplary implementation wherein the longitudinal axis 124 of the strut 104 extends approximately parallel with the pitch axis 174 when the landing gear 100 is in the retracted position 112. The angle β may be referred to herein as a "first angle". The angle α may be referred to herein as a "second angle".

Referring again to FIGS. 4 and 5, in the exemplary implementation, the hinge 146 has a structure similar to a clevis, but the hinge 146 additionally or alternatively includes any other structure that enables the hinge 146 and the truck assembly 106 to function as described and/or illustrated herein (e.g., enables the truck assembly 106 to pivot the wheels 120 between the landing position 118 and the stowing position 122, etc.). Examples of other structures additionally or alternatively included by the hinge 146 include, but are not limited to, a universal joint, a ball joint, a spherical joint, a spring hinge, a bearing, and/or the like. In the exemplary implementation, the truck assembly 106 includes one or more stops 176 (e.g., a pad, a platform, a bumper, etc.) configured to limit movement of the truck beam 142 (and thus the wheel 120) past the landing position 118 of the truck assembly 106. Moreover, the exemplary implementation of the hinge 146 has a limited angle of rotation that limits movement of the truck beam 142 (and thus the wheels 120) past the stowing position 122. In some other implementations, the truck assembly 106 includes one or more stops (not shown) that limit movement of the truck beam 142 (and thus the wheels 120) past the stowing position 122 and/or the hinge 146 has a limited angle of rotation that limits movement of the truck beam 142 (and thus the wheels 120) past the landing position 118.

Referring now to FIGS. 4, 5, and 7, as briefly described above, the truck assembly 106 includes the actuator 148. The actuator 148 is operatively connected to the truck beam 142 and the strut 104 such that the actuator 148 is configured to actuate rotation of the truck beam 142 about the hinge 146 and thereby pivot the truck beam 142 (and thus the wheels 120) between the landing position 118 and the stowing position 122. In the exemplary implementation, the actuator 148 is a linear actuator that includes a hydraulically actuated piston 178. Specifically, the actuator 148 includes a hydraulic cylinder 180 (not visible in FIG. 3) that holds the piston 178, and a link arm 182. The piston 178 includes a piston rod 184 and a piston head 186 (not visible in FIG. 4). The piston rod 184 extends a length from an end portion 188 (not visible in FIG. 4) to an opposite end portion 190. The piston head 186 is positioned at the end portion 188 of the piston rod 184 and includes opposite first and second pressure sides 192 and 194, respectively. An end portion 196 of the link arm 182 is connected to the end portion 190 of the piston rod 184. An opposite end portion 198 of the link arm 182 is connected to the truck beam 142.

In operation, to pivot the truck assembly 106 from the landing position 118 shown in FIGS. 5 and 7 to the stowing position 122 shown in FIG. 4, hydraulic pressure is applied to the second pressure side 194 of the piston head 186. When the hydraulic pressure acting on the second pressure side 194 of the piston head 186 overcomes hydraulic pressure acting on the first pressure side 192 of the piston head 186, the piston 178 is moved in the direction of the arrow 200. As the piston 178 moves in the direction 200, the end portion 196 of the link arm 182 moves along with the piston 178 in the direction 200, which causes the opposite end portion 198 of the link arm 182 to push the truck beam 142 along the arc 114 in the direction of the arrow 202 and thereby pivot the wheels 120 to the stowing position 122.

To pivot the truck assembly 106 from the stowing position 122 to the landing position 118, hydraulic pressure is applied to the first pressure side 192 of the piston head 186. When the hydraulic pressure acting on the first pressure side 192 of the piston head 186 overcomes hydraulic pressure acting on the second pressure side 194 of the piston head 186, the piston 178 is moved in the direction of the arrow 204. As the piston 178 moves in the direction 204, the end portion 196 of the link arm 182 moves along with the piston 178 in the direction 204, which causes the opposite end portion 198 of the link arm 182 to pull the truck beam 142 along the arc 114 in the direction of the arrow 206 and thereby pivot the wheels 120 to the landing position 118.

Optionally, the truck assembly 106 is (and thus the wheels 120 are) biased toward the landing position 118 shown in FIG. 3. In the exemplary implementation, the first pressure side 192 of the piston head 186 has a greater effective surface area than the second pressure side 194, as is shown in FIGS. 5 and 7. Accordingly, when the hydraulic pressure acting on the first pressure side 192 is approximately equal to the hydraulic pressure acting on the second pressure side 194, the greater effective surface area of the first pressure side 192 generates a biasing force that acts on the piston 178 in the direction 204 to bias the truck assembly 106, and thus the wheels 120, toward the landing position 118. The difference between the effective surface area of the first pressure side 192 and the second pressure side 194 is optionally selected to provide a predetermined biasing force on the piston 178 in the direction 204, for example to facilitate counteracting gravity acting on the mass of the wheels 120 to pull the wheels 120 toward the stowing position 122 when the landing gear 100 is in the deployed position 110, etc.

In addition or alternative to the different effective surface areas of the pressure sides 192 and 194, the actuator 148 and/or another component of the truck assembly 106 may include any other type of biasing mechanism, such as, but not limited to, a mechanical spring (e.g., a helical spring, a coil spring, a leaf spring, etc.), a gas charge, and/or the like.

Referring now solely to FIG. 4, one or more constraints 208 (e.g., a pad, a platform, a bumper, etc.) is optionally provided within the aircraft fuselage 170 to constrain movement of the truck assembly 106 when the wheels 120 of the truck assembly 106 are stowed within the aircraft fuselage 170 in the stowing position 122. For example, the constraint(s) 208 may facilitate preventing the truck assembly 106 from moving toward the landing position 118, for example due to the bias toward the landing position 118 described above, a command error, a mechanical failure, hydraulic failure, etc. In some implementations, the constraint(s) 208 facilitate enabling the wheels 120 to exit the fuselage 170 during deployment of the landing gear 100 (e.g., facilitate preventing the wheels 120 from moving toward the landing position 118 and thereby jamming within the fuselage 170 as the landing gear 100 is deployed, etc.).

In addition or alternative to the exemplary implementation of the actuator shown and described herein, the actuator 148 may include any type of actuator having any structure that enables the actuator 148 to function as described and/or illustrated herein (e.g., to pivot the truck assembly 106 between the landing position 118 and the stowing position 122, etc.). Examples of other types of actuators and components thereof that may be used in addition or alternatively to the exemplary implementation of the actuator 148 shown and described herein include, but are not limited to, other types of linear actuators (e.g., magnetic linear actuators, screw-type linear actuators, ball screws, lead screws, screw jacks, leadscrews, roller screws, linear motors, telescoping linear actuators, solenoids, etc.), rotary actuators, rotary screws, other types of hydraulic actuators, pneumatic actuators, electrical actuators, electromechanical actuators, electrical motors, servomechanisms, gears, chains, pulleys, differentials, counterweights, and/or the like.

Figure 8A:
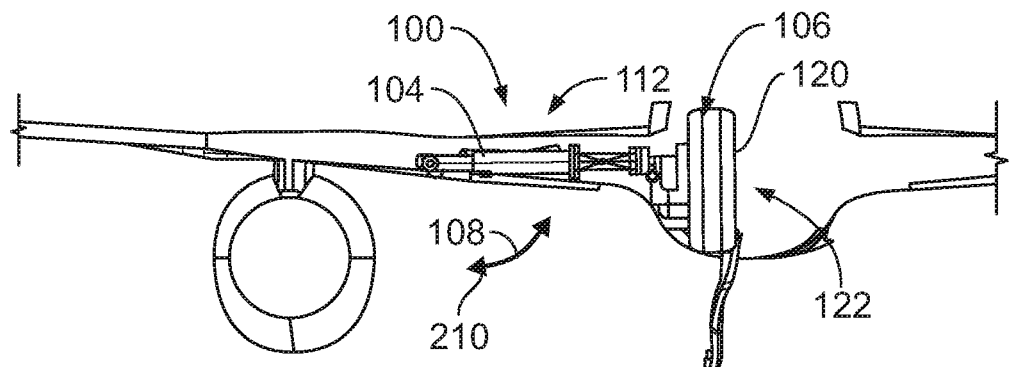
FIGS. 8a-8f are elevational views illustrating retraction and deployment of the landing gear shown in FIG. 1 according to an implementation.
Figure 8B:
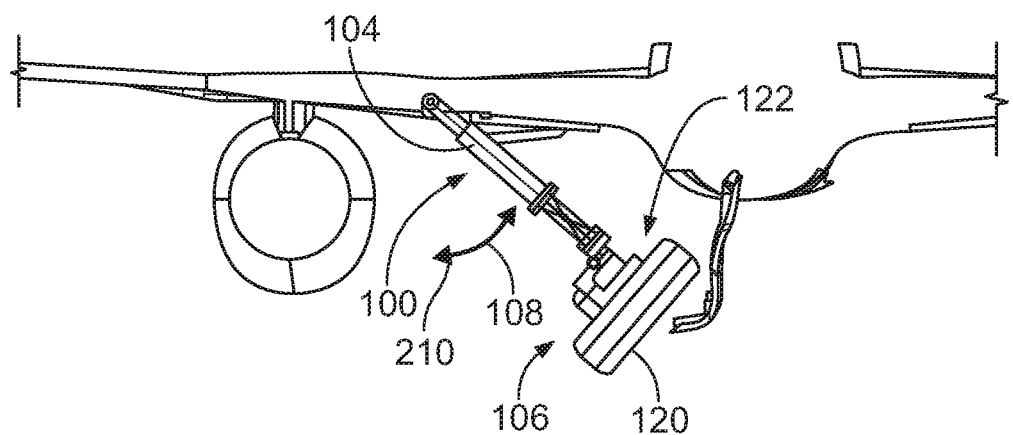
Figure 8C:
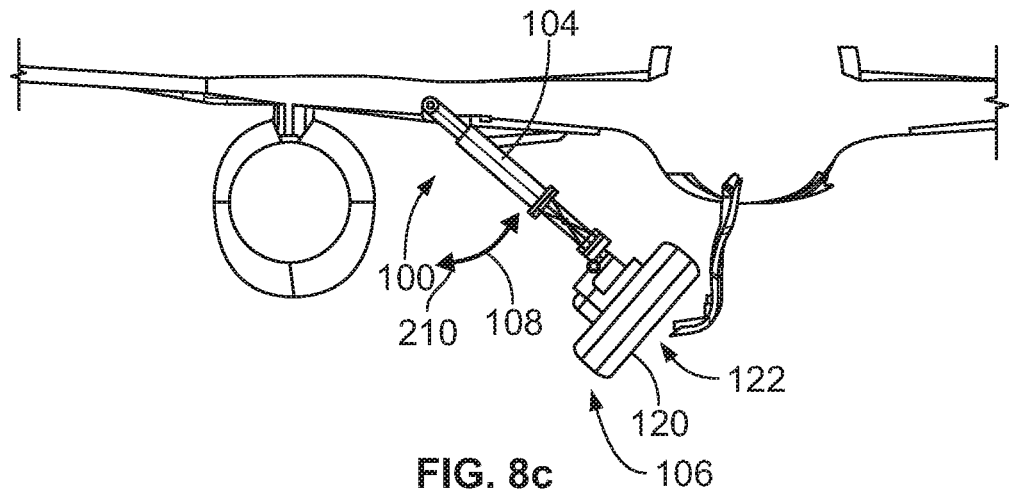
Figure 8D:
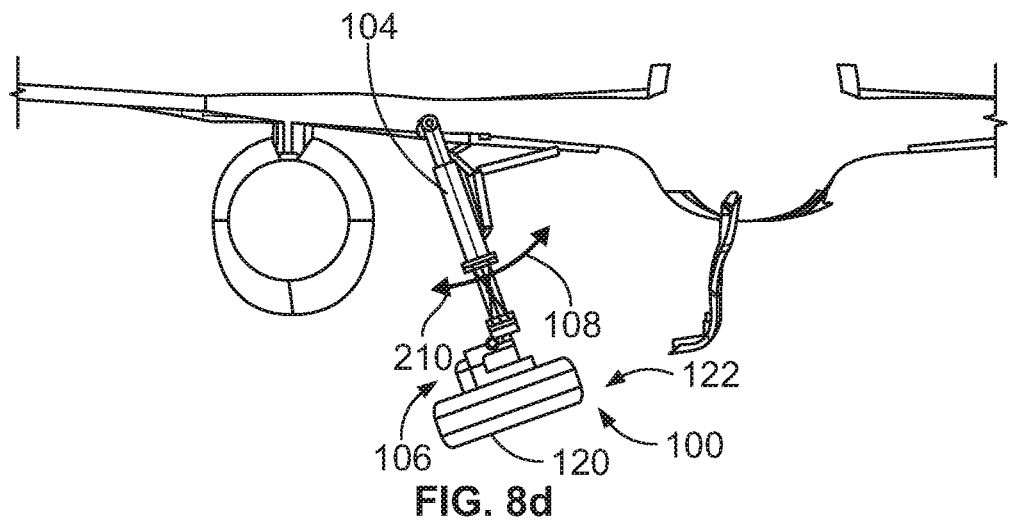
Figure 8E:
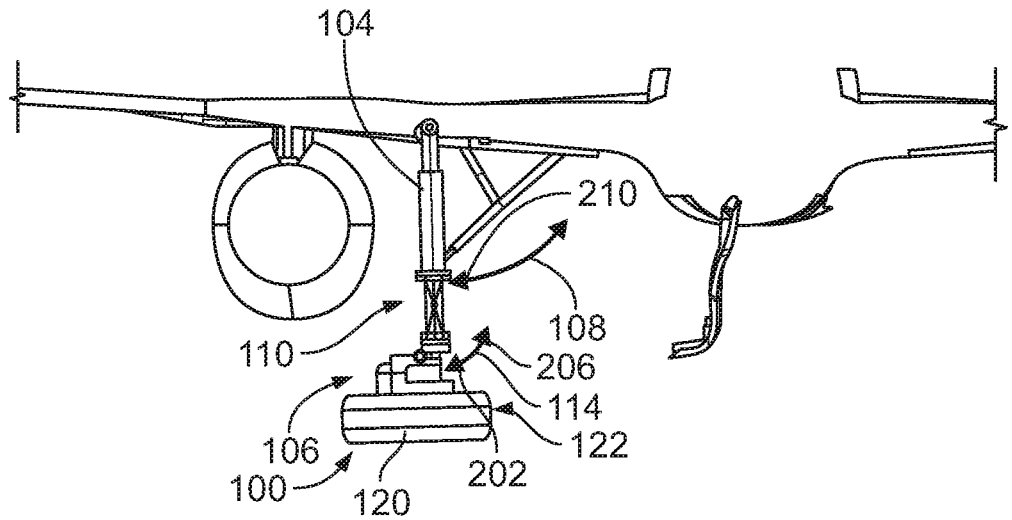
Figure 8F:
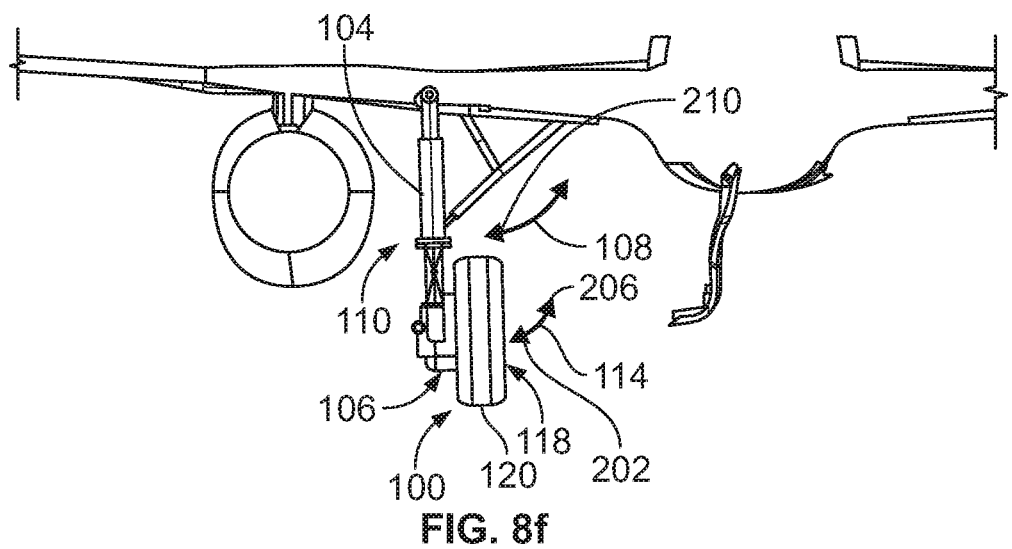

Referring now to FIGS. 8a-8f, retraction and deployment of the landing gear 100 will now be described. To deploy the landing gear 100 from the retracted position 112 illustrated in FIG. 8a, the strut 104 of the landing gear 100 is pivoted (e.g., lowered, etc.) along the arc 108 in the direction of the arrow 210 to the deployed position 110 of the landing gear 100 shown in FIGS. 8*e* and 8*f*. As is shown in FIGS. 8*e* and 8*f*, the actuator 148 (shown in FIGS. 4, 5, and 7) then pivots the truck assembly 106 along the arc 114 in the direction 206 from the stowing position 122 shown in FIG. 8*e* to the landing position 118 of the wheels 120 shown in FIG. 8*f*. In the exemplary implementation shown in FIGS. 8*a*-8*f*, the actuator 148 pivots the truck assembly 106 from the stowing position 122 to the landing position 118 after the strut 104 has been pivoted to the deployed position shown in FIGS. 8*e* and 8*f*. However, in other implementations the actuator 148 pivots the truck assembly 106 from the stowing position 122 to the landing position 118 simultaneously with at least a portion of the movement of the strut 104 from the retracted position 112 to the deployed position 110. In other words, in some other implementations, the actuator 148 begins to pivot the truck assembly 106 from the stowing position 122 to the landing position 118 before the strut 104 has reached the deployed position 110.

To retract the landing gear 100 from the deployed position 110 illustrated in FIG. 8*f*, the actuator 148 pivots the truck assembly 106 along the arc 114 in the direction 202 from the landing position 118 shown in FIG. 8*f* to the stowing position 122 of the wheels 120 shown in FIG. 8*e*. The strut 104 of the landing gear 100 is then pivoted (e.g., raised, etc.) along the arc 108 in the direction of the arrow 212 to the retracted position 112 of the landing gear 100, as is shown in FIGS. 8*e*-8*a*. In the exemplary implementation shown in FIGS. 8*a*-8*f*, the actuator 148 pivots the truck assembly 106 from the landing position 118 to the stowing position 122 before the strut 104 has been pivoted to the retracted position shown in FIG. 8*a*. However, in other implementations the actuator 148 pivots the truck assembly 106 from the landing position 118 to the stowing position 122 simultaneously with at least a portion of the movement of the strut 104 from the deployed position 110 to the retracted position 112. In other words, in some other implementations, the strut 104 begins to pivot from the deployed position 110 before the truck assembly 106 has reached the stowing position 122.

Figure 9:
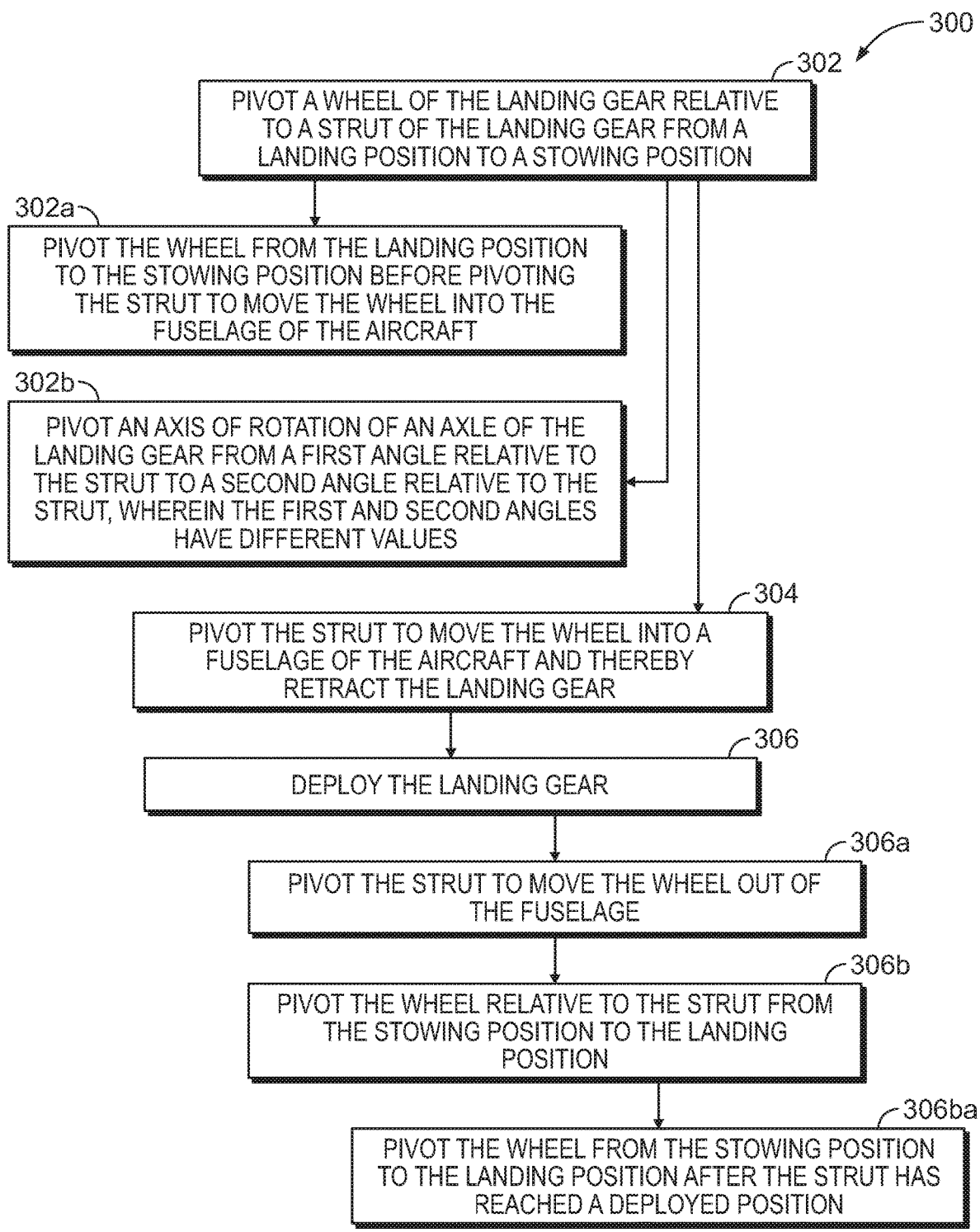
FIG. 9 is a flow chart illustrating a method of operating landing gear according to an implementation.

FIG. 9 illustrates a method 300 of operating an aircraft (e.g., the aircraft 102 shown in FIG. 1, the aircraft 400 shown in FIG. 10, etc.) that includes landing gear (e.g., the landing gear 100 shown in FIGS. 1-8, etc.) according to an implementation. The method 300 includes pivoting, at 302, a truck assembly of the landing gear relative to a strut of the landing gear from a landing position to a stowing position. At 304, the method 300 includes pivoting the strut to move the wheel into a fuselage of the aircraft and thereby retract the landing gear.

In some implementations, pivoting at 302 the truck assembly relative to the strut from the landing position to the stowing position includes pivoting, at 302*a*, the truck assembly from the landing position to the stowing position before pivoting at 304 the strut to move the wheel into the fuselage of the aircraft. In some implementations, pivoting at 302 the truck assembly relative to the strut from the landing position to the stowing position includes pivoting, at 302*b*, the truck assembly such that an axis of rotation of an axle of the truck assembly moves from a first angle relative to the strut to a second angle relative to the strut, wherein the first and second angles have different values.

Optionally, the method 300 includes deploying, at 306, the landing gear. Deploying at 306 the landing gear includes pivoting, at 306*a*, the strut to move the wheel out of the fuselage. At 306*b*, deploying at 306 the landing gear includes pivoting the truck assembly relative to the strut from the stowing position to the landing position.

In some implementations, pivoting at 306*b* the truck assembly relative to the strut from the stowing position to the landing position includes pivoting, at 306*ba*, the truck assembly from the stowing position to the landing position after the strut has reached a deployed position of the landing gear.

Figure 10:
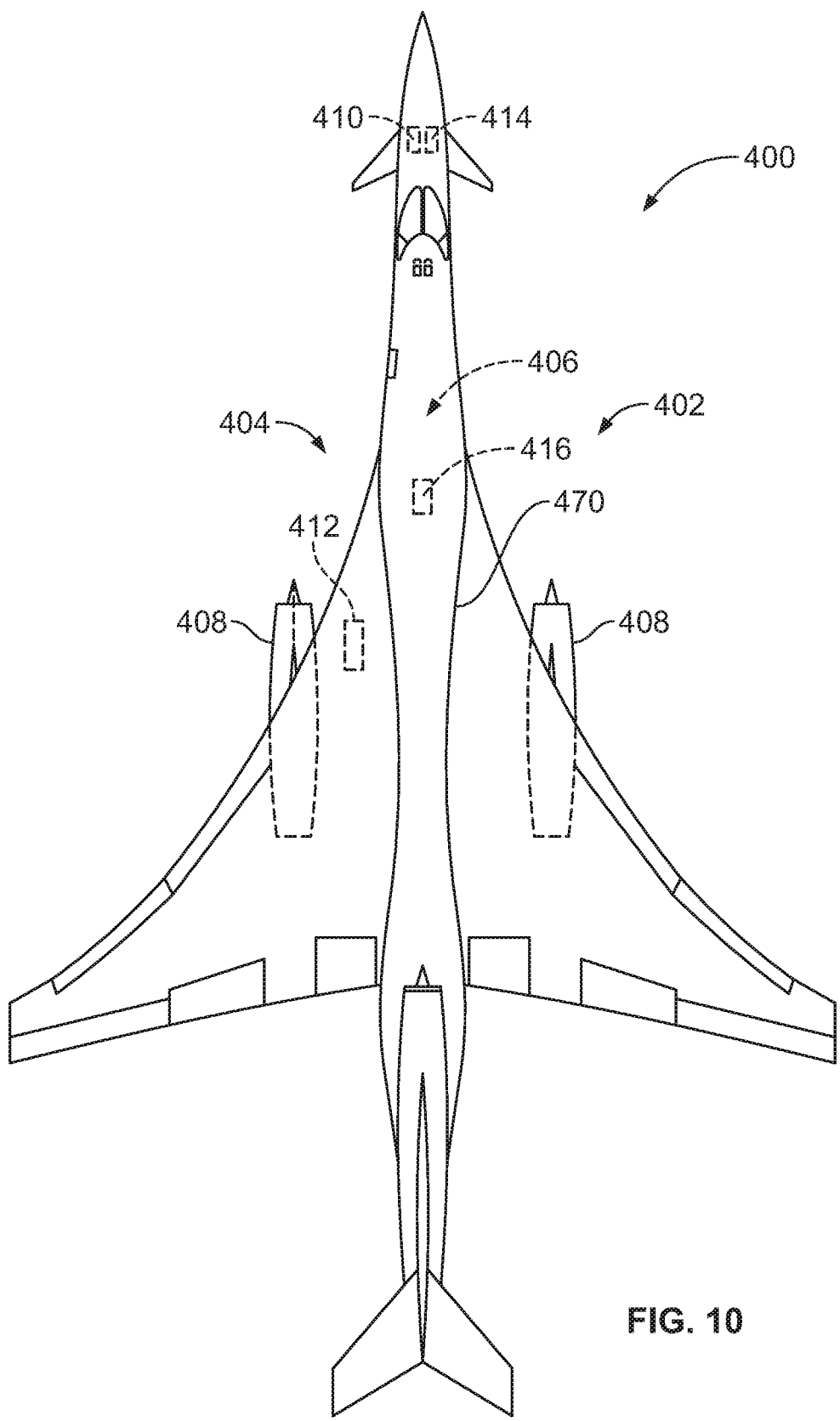
FIG. 10 is a schematic view of an implementation of an aircraft.

Referring now to FIG. 10, examples of the disclosure may be described in the context of using the landing gear disclosed herein on an aircraft 400 that includes an airframe 402 having a fuselage 470. The aircraft 400 includes a plurality of high-level systems 404 and an interior 406. Examples of high-level systems 404 include one or more of a propulsion system 408, an electrical system 410, a hydraulic fluid system 412, a control system 414, and an environmental system 416. Any number of other systems can be included. Although a supersonic aircraft is shown, the landing gear disclosed herein can be used with any other type of aircraft, such as, but not limited to, subsonic aircraft, hypersonic aircraft, and/or the like. Moreover, the landing gear disclosed herein is not limited to being used with aircraft having wing-mounted engines or wing-mounted landing gear, but rather the landing gear disclosed herein can be used with any other type of aircraft (e.g., aircraft having one or more engines that are not mounted on a wing of the aircraft, aircraft that include landing gear that is not mounted on a wing of the aircraft, etc.).

The landing gear implementations disclosed herein more efficiently stow the wheel(s) of landing gear within an aircraft fuselage, for example to reduce unused space in the fuselage and provide compact stowage of the landing gear system. For example, at least some existing landing gear systems have wheels that follow the orientation of the leg (i.e., the strut) of the landing gear as the leg pivots between deployed and retracted positions of the landing gear. Accordingly, when the existing landing gear is stowed in the retracted position of the landing gear, the wheels are oriented generally horizontally, which causes the landing gear to occupy more space in the wheel well and fuselage than desired.

The landing gear implementations disclosed herein reduce the frontal area of at least some aircraft. For example, certain implementations of the landing gear disclosed herein eliminate, or reduce the size of, fairings used to enclose the wheel(s) of aircraft landing gear. The landing gear implementations disclosed herein reduce the drag coefficient of at least some aircraft. The landing gear implementations disclosed herein increase the operating range of at least some aircraft. The landing gear implementations disclosed herein provide an increased design freedom of the size and location of the wheel well, which for example may increase fuel volume capacity, improve aero optimization, improve system integration (e.g., via routings of systems in and out of the wing, etc.) decrease weight (e.g., via mid-fuselage sizing, wing structural spar layout, structural efficiency, keel length sizing, etc.), and/or the like.

The following clauses describe further aspects:

Clause Set A:

A1. A truck assembly for aircraft landing gear, the truck assembly comprising:

a hinge connecting a truck beam to a strut of the landing gear, the hinge configured to allow the truck beam to rotate about the hinge relative to the strut transversely with respect to the length of the truck beam to thereby pivot the truck assembly relative to the strut between a landing position and a stowing position.

A2. The truck assembly of any preceding clause, wherein the truck beam is configured to pivot longitudinally relative to the strut with respect to the length of the truck beam.

A3. The truck assembly of any preceding clause, wherein the hinge is a first hinge that comprises a first hinge axis about which the truck beam rotates relative to the strut, the truck beam being configured to rotate about a second hinge axis of a second hinge of the truck assembly, the first and second hinge axes being non-parallel.

A4. The truck assembly of any preceding clause, wherein the truck beam extends a length along a central longitudinal axis, the truck beam configured to pivot along a first arc relative to the strut of the landing gear, the truck beam rotating about the hinge along a second arc that extends non-parallel to the first arc.

A5. The truck assembly of any preceding clause, wherein an axis of rotation of an axle of the truck assembly extends at a first angle relative to the strut in the landing position of the truck assembly and a second angle relative to the strut in the stowing position of the truck assembly, the first and second angles having different values.

A6. The truck assembly of any preceding clause, wherein the truck beam extends a length along a central longitudinal axis and the hinge comprises a hinge axis about which the truck beam rotates relative to the strut, the hinge axis of the hinge being offset from the central longitudinal axis of the truck beam.

A7. The truck assembly of any preceding clause, further comprising an actuator operatively connected to the truck beam such that the actuator is configured to actuate rotation of the truck beam about the hinge.

A8. The truck assembly of any preceding clause, further comprising an actuator operatively connected to the truck beam such that the actuator is configured to actuate rotation of the truck beam about the hinge, wherein the actuator comprises at least one of a linear actuator or a hydraulic piston.

A9. The truck assembly of any preceding clause, wherein the truck assembly is biased toward the landing position.

A10. The truck assembly of any preceding clause, further comprising an actuator operatively connected to the truck beam such that the actuator is configured to actuate rotation of the truck beam about the hinge, wherein the actuator comprises a hydraulic piston having a piston head that includes opposite first and second pressure sides, the first pressure side having a greater surface area than the second pressure side such that the truck assembly is biased toward the landing position.

A11. The truck assembly of any preceding clause, further comprising at least one stop configured to limit movement of the truck assembly past the landing position.

A12. The truck assembly of any preceding clause, wherein the truck assembly comprises at least two wheels.

A13. The truck assembly of any preceding clause, wherein the truck beam extends a length along a central longitudinal axis and the truck assembly comprises two wheels arranged in series along the central longitudinal axis of the truck beam.

Clause Set B:

B1. An aircraft comprising: landing gear comprising a strut and a truck assembly, the truck assembly comprising:
  a hinge connecting a truck beam to the strut, the hinge configured to allow the truck beam to rotate about the hinge relative to the strut transversely with respect to the length of the truck beam to thereby pivot the truck assembly relative to the strut between a landing position and a stowing position.

B2. The aircraft of any preceding clause, wherein the truck beam is configured to pivot relative to the strut longitudinally with respect to the length of the truck beam.

B3. The aircraft of any preceding clause, wherein the hinge is a first hinge that comprises a first hinge axis about which the truck beam rotates relative to the strut, the truck beam being configured to rotate about a second hinge axis of a second hinge of the truck assembly, the first and second hinge axes being non-parallel.

B4. The aircraft of any preceding clause, wherein the truck beam extends a length along a central longitudinal axis, the truck beam configured to pivot along a first arc relative to the strut of the landing gear, the truck beam rotating about the hinge along a second arc that extends non-parallel to the first arc.

B5. The aircraft of any preceding clause, wherein an axis of rotation of an axle of the truck assembly extends at a first angle relative to the strut in the landing position of the truck assembly and a second angle relative to the strut in the stowing position of the truck assembly, the first and second angles having different values.

B6. The aircraft of any preceding clause, wherein the truck beam extends a length along a central longitudinal axis and the hinge comprises a hinge axis about which the truck beam rotates relative to the strut, the hinge axis of the hinge being offset from the central longitudinal axis of the truck beam.

B7. The aircraft of any preceding clause, wherein the truck assembly further comprises an actuator operatively connected to the truck beam such that the actuator is configured to actuate rotation of the truck beam about the hinge.

B8. The aircraft of any preceding clause, wherein the truck assembly is biased toward the landing position.

Clause Set C:

C1. A method of operating the aircraft of clause B1, the method comprising:
  pivoting the truck assembly relative to the strut from the landing position to the stowing position; and
  pivoting the strut to move the wheel into a fuselage of the aircraft and thereby retract the landing gear.

C2. The method of any preceding clause, further comprising deploying the landing gear, wherein deploying the landing gear comprises:
  pivoting the strut to move the wheel out of the fuselage; and pivoting the truck assembly relative to the strut from the stowing position to the landing position.

C3. The method of any preceding clause, wherein pivoting the truck assembly relative to the strut from the stowing position to the landing position comprises pivoting the truck assembly from the stowing position to the landing position after the strut has reached a deployed position of the landing gear.

C4. The method of any preceding clause, wherein pivoting the truck assembly relative to the strut from the landing position to the stowing position comprises pivoting the truck assembly from the landing position to the stowing position before pivoting the strut to move the wheel into the fuselage of the aircraft.

C5. The method of any preceding clause, wherein pivoting the truck assembly relative to the strut from the landing position to the stowing position comprises pivoting the truck assembly such that an axis of rotation of an axle of the truck assembly moves from a first angle relative to the strut to a second angle relative to the strut, wherein the first and second angles have different values.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation (e.g., different steps, etc.) is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A truck assembly for aircraft landing gear, the truck assembly comprising:
    a hinge connecting a truck beam to a strut of the landing gear, the hinge configured to allow the truck beam to rotate about the hinge relative to the strut transversely with respect to the length of the truck beam to thereby pivot the truck assembly relative to the strut between a landing position and a stowing position; and
    an actuator operatively connected to the truck beam such that the actuator is configured to actuate rotation of the truck beam about the hinge, wherein the actuator comprises a biasing mechanism configured to generate a biasing force that biases the truck assembly toward the landing position.

2. The truck assembly of claim 1, wherein the truck beam is configured to pivot longitudinally relative to the strut with respect to the length of the truck beam.

3. The truck assembly of claim 1, wherein the hinge is a first hinge that comprises a first hinge axis about which the truck beam rotates relative to the strut, the truck beam being configured to rotate about a second hinge axis of a second hinge of the truck assembly, the first and second hinge axes being non-parallel.

4. The truck assembly of claim 1, wherein the truck beam extends a length along a central longitudinal axis, the truck beam configured to pivot along a first arc relative to the strut of the landing gear, the truck beam rotating about the hinge along a second arc that extends non-parallel to the first arc.

5. The truck assembly of claim 1, wherein an axis of rotation of an axle of the truck assembly extends at a first angle relative to the strut in the landing position of the truck assembly and a second angle relative to the strut in the stowing position of the truck assembly, the first and second angles having different values.

6. The truck assembly of claim 1, wherein the truck beam extends a length along a central longitudinal axis and the hinge comprises a hinge axis about which the truck beam rotates relative to the strut, the hinge axis of the hinge being offset from the central longitudinal axis of the truck beam.

7. The truck assembly of claim 1, further comprising an actuator operatively connected to the truck beam such that the actuator is configured to actuate rotation of the truck beam about the hinge.

8. The truck assembly of claim 1, further comprising an actuator operatively connected to the truck beam such that the actuator is configured to actuate rotation of the truck beam about the hinge, wherein the actuator comprises at least one of a linear actuator or a hydraulic piston.

9. The truck assembly of claim 1, wherein the truck assembly is biased toward the landing position.

10. A truck assembly for aircraft landing gear, the truck assembly comprising:
    a hinge connecting a truck beam to a strut of the landing gear, the hinge configured to allow the truck beam to rotate about the hinge relative to the strut transversely with respect to the length of the truck beam to thereby pivot the truck assembly relative to the strut between a landing position and a stowing position; and
    an actuator operatively connected to the truck beam such that the actuator is configured to actuate rotation of the truck beam about the hinge, wherein the actuator comprises a hydraulic piston having a piston head that includes opposite first and second pressure sides, the first pressure side having a greater surface area than the second pressure side such that the truck assembly is biased toward the landing position.

11. The truck assembly of claim 10, further comprising at least one stop configured to limit movement of the truck assembly past the landing position.

12. The truck assembly of claim 10, wherein the truck assembly comprises at least two wheels.

13. The truck assembly of claim 10, wherein the truck beam extends a length along a central longitudinal axis and the truck assembly comprises two wheels arranged in series along the central longitudinal axis of the truck beam.

14. An aircraft comprising:
    landing gear comprising a strut and a truck assembly, the truck assembly comprising:
    a hinge connecting a truck beam to the strut, the hinge configured to allow the truck beam to rotate about the hinge relative to the strut transversely with respect to the length of the truck beam to thereby pivot the truck assembly relative to the strut between a landing position and a stowing position, wherein the truck assembly is biased toward the landing position against gravity using at least one of a spring, a gas charge, or a surface area difference.

15. The aircraft of claim 14, wherein the truck beam is configured to pivot relative to the strut longitudinally with respect to the length of the truck beam.

16. The aircraft of claim 14, wherein the hinge is a first hinge that comprises a first hinge axis about which the truck beam rotates relative to the strut, the truck beam being configured to rotate about a second hinge axis of a second hinge of the truck assembly, the first and second hinge axes being non-parallel.

17. The aircraft of claim 14, wherein the truck beam extends a length along a central longitudinal axis, the truck beam configured to pivot along a first arc relative to the strut of the landing gear, the truck beam rotating about the hinge along a second arc that extends non-parallel to the first arc.

18. The aircraft of claim 14, wherein an axis of rotation of an axle of the truck assembly extends at a first angle relative to the strut in the landing position of the truck assembly and a second angle relative to the strut in the stowing position of the truck assembly, the first and second angles having different values.

19. The aircraft of claim 14, wherein the truck beam extends a length along a central longitudinal axis and the hinge comprises a hinge axis about which the truck beam rotates relative to the strut, the hinge axis of the hinge being offset from the central longitudinal axis of the truck beam.

20. The aircraft of claim 14, wherein the truck assembly further comprises an actuator operatively connected to the truck beam such that the actuator is configured to actuate rotation of the truck beam about the hinge.

21. The aircraft of claim 14, wherein the truck assembly is biased toward the landing position.

22. A method of operating the aircraft of claim 14, the method comprising:
    pivoting the truck assembly relative to the strut from the landing position to the stowing position; and
    pivoting the strut to move the wheel into a fuselage of the aircraft and thereby retract the landing gear.

23. The method of claim 22, further comprising deploying the landing gear, wherein deploying the landing gear comprises:
    pivoting the strut to move the wheel out of the fuselage; and
    pivoting the truck assembly relative to the strut from the stowing position to the landing position.

24. The method of claim 23, wherein pivoting the truck assembly relative to the strut from the stowing position to the landing position comprises pivoting the truck assembly from the stowing position to the landing position after the strut has reached a deployed position of the landing gear.

25. The method of claim 22, wherein pivoting the truck assembly relative to the strut from the landing position to the stowing position comprises pivoting the truck assembly from the landing position to the stowing position before pivoting the strut to move the wheel into the fuselage of the aircraft.

26. The method of claim 22, wherein pivoting the truck assembly relative to the strut from the landing position to the stowing position comprises pivoting the truck assembly such that an axis of rotation of an axle of the truck assembly moves from a first angle relative to the strut to a second angle relative to the strut, wherein the first and second angles have different values.

\* \* \* \* \*